United States Patent [19]

Gould et al.

[11] Patent Number: 4,523,606
[45] Date of Patent: Jun. 18, 1985

[54] DISTRIBUTION VALVE

[75] Inventors: Charles M. Gould, Glendale; Andy F. Blake, Phoenix, both of Ariz.

[73] Assignee: Shasta Industries, Inc., Phoenix, Ariz.

[21] Appl. No.: 487,758

[22] Filed: Apr. 22, 1983

[51] Int. Cl.³ .............................................. F16K 31/16
[52] U.S. Cl. ............................... 137/119; 137/624.14; 137/627; 137/630.2; 137/DIG. 2
[58] Field of Search .................. 137/119, 624.14, 627, 137/630.2, DIG. 2; 415/188

[56] References Cited

U.S. PATENT DOCUMENTS

| | | | |
|---|---|---|---|
| 1,588,528 | 6/1926 | Couch | 415/188 |
| 3,181,551 | 5/1965 | Coletti | 137/119 |
| 3,405,733 | 10/1968 | Hansen | 137/624.14 |
| 4,077,424 | 3/1978 | Ehret | 137/119 |
| 4,313,455 | 2/1982 | Pitman | 137/119 |

Primary Examiner—Robert G. Nilson
Attorney, Agent, or Firm—Cahill, Sutton & Thomas

[57] ABSTRACT

A distribution valve includes a housing having an upper fluid inlet, a plurality of bottom fluid outlets, and enclosing a plurality of bottom fluid outlets, and enclosing a rotary impeller disposed directly beneath the fluid inlet, a plurality of stationary baffles disposed between a bottom plate of the impeller and the fluid inlet for directing portions of the incoming fluid directly at a plurality of vertical vanes supported at the bottom plate of the impeller. A stationary planetary gear disposed about a vertical axis of the distribution valve, a pair of symmetric gear assemblies each driven by a drive gear attached to the impeller, each of the symmetric gear assemblies being supported on a rotary gear assembly base, and each also having an outer gear engaging the teeth of the planetary gear cooperate to cause the rotary gear assembly base to rotate in response to rotation of the impeller. A foot-shaped cam is attached to the lower portion of the rotary gear assembly base and rotates through a 360° angle, sequentially displacing each of a plurality of spherical valve balls from its seat in the bottom of the housing. The radius of the cam from its eccentric point to the point of initial contact with each valve ball is shorter than the radius to subsequent contact points to obtain higher initial mechanical advantage.

8 Claims, 5 Drawing Figures

DISTRIBUTION VALVE

BACKGROUND OF THE INVENTION

The invention relates to fluid distribution valves of the type which sequentially open a plurality of outlet ports of a closed chamber that receives pressurized fluid via an inlet port, and more particularly to an improved distribution valve having a high efficiency impeller, gear assembly, and sequential valve actuation mechanism.

Multi-outlet fluid distribution valves that receive fluid under high pressure through an inlet port and distribute the fluid, one port at a time, through sequential outlet ports are commonly used in self-cleaning swimming pool systems. In such systems, swimming pool water is pumped at high pressure, typically roughly twenty to forty pounds per square inch, into the inlet port of the distribution valve. The outlet ports are coupled by lengths of PVC pipe to spaced "cleaning heads" that are installed in the bottom of the swimming pool surface and eject rotary jets of high pressure water along the bottom of the pool to effectively sweep circular areas around each cleaning head. For example, a fluid distribution valve bearing some resemblance to the one disclosed in U.S. Pat. 3,405,733, issued to K. W. Hansen on Oct. 15, 1968 and assigned to the present assignee using the basic concept of a manifold with a rotary, gear and impeller driven valve, has been used for this purpose. Design disclosed therein has been quite workable and, in fact, quite a number of similar valves, modified in various respects have been introduced to the market, and the basic design of that distribution valve has proven to be quite difficult to improve upon. Nevertheless, experience in the swimming pool industry has indicated that there is a need for improved implementation of the subject distribution valve. Chemicals commonly used in swimming pool water have been found to gradually weaken and degrade some of the plastic and metal components that have been used in prior distribution valves. Some of the prior distribution valves have not been reliable in the presence of substantial variations in the inlet pressure, or at low water flow rates. In some cases, build-up of debris on some of the components of prior distribution valves has interferred with their proper operation, increasing maintenance costs, especially when the chemical balance of the swimming pool water has not been properly maintained.

Accordingly, it is an object of the invention to provide an improved distribution valve that operates reliably at low inlet pressures and low fluid flow rates, is more resistant to degradation caused by swimming pool chemicals, and requires less maintenance than prior distribution valves.

Summary of the Invention

Briefly described, and in accordance with one embodiment thereof, the invention provides an improved fluid distribution valve including an inlet port for receiving fluid at high pressures and a plurality of fluid outlet ports, and also includes an internal outlet port valve actuation mechanism including a plurality of spherical valve balls that normally rest on circular seats closing the respective outlet ports, a foot-shaped rotary cam for sequentially unseating the ball valves, wherein the cam is driven by a gear assembly that in turn is driven by a high efficiency impeller positioned beneath the inlet port. In the described embodiment of the invention, the foot-shaped cam has a modified oval configuration that causes a peripheral edge thereof to initially engage each valve ball at a point whereat the effective radius of the cam is shorter than the radii of subsequent points at which the cam contacts that valve ball to unseat it, thereby providing a large initial mechanical advantage. The "toe" portion of the cam maintains the previously unseated valve ball in an unseated configuration until the present valve ball becomes at least slightly unseated in order to avoid build-up of excessive fluid pressure in the interior of the distribution valve. The foot-shaped cam has a downwardly extending "heel" that minimizes friction between the cam and the bottom surface of the distribution valve housing. The gear assembly includes two symmetrical gear trains each supported on a rotary gear support plate to which the foot-shaped cam is rigidly attached. An inner gear of each gear train is driven by a drive gear attached to the impeller. An outer gear of each of the symmetrical gear assemblies engages a stationary planetary gear, thereby causing the gear support plate to rotate in response to rotation of the impeller. The impeller includes a horizontal star-shaped base plate with a plurality of vertical vanes attached thereto. Water received under high pressure from the inlet port is deflected by a plurality of vertical, semi-cylindrical, outwardly oriented baffles that extend nearly to the surface of the star-shaped base plate of the impeller to deflect the incoming water against the horizontal surfaces of the star-shaped sections and directly against the vanes. As the impeller continues to rotate, V-shaped gaps between the star-shaped protrusions allow water to pass downward into the gear assembly after the energy of the water has been expended in rotating the impeller.

DESCRIPTION OF THE INVENTION

Figure 1:
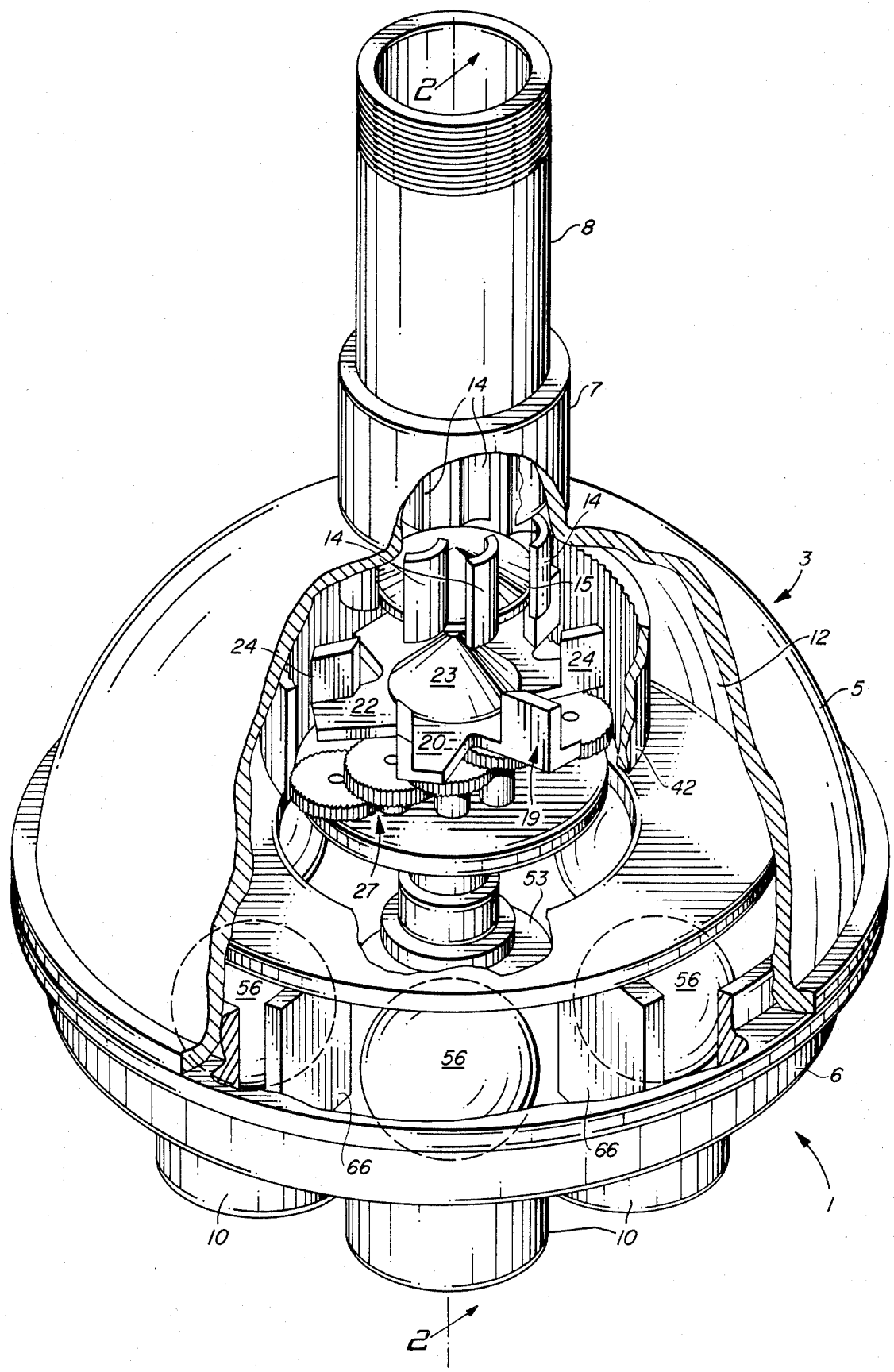
FIG. 1 is a partial perspective cutaway view of the distribution valve of the present invention.

Referring now to the drawings, especially FIG. 1, fluid distribution valve 1 includes a housing 3 having an upper dome-shaped portion 5 and a lower section 6 that is severable from but is normally sealably attached to upper section 5. At the peak of upper section 5 there is a cylindrical inlet port 7. An inlet tube 8 is received by inlet port 7. Housing 3, including inlet port portion 7 and upper section 5, includes five outlet ports 10 which are disposed on the bottom surface of lower housing section 6, is composed of glass filled polycarbonate. Inlet tube 8 can be composed of any conventional pipe material such as PVC pipe.

Inside of housing 3 there is an open chamber 12. Just beneath inlet port 7 and attached to the upper interior surface of upper housing portion 5 there are a plurality of vertical "diversion baffles" 14, each of which is preferably molded integrally with upper housing section 5. Each baffle 14 has the generally semi-cylindrical shape. Typically, there are eight such equally spaced baffles. Attached to the lower inner edge of each of the vertical baffles 14 is a cone 15. As subsequently explained, the purpose of baffles 14 and cone 15 is to divert high pressure water from inlet port 7. This inlet water first is forced on inlet port 7 onto cone 15, so that it is diverted uniformly outward against the vertical baffles 14. Baffles 14 then deflect equal portions of the inlet water against the star-shaped protrusions 30 (FIG. 5) of impeller 19.

At this point, it should be emphasized that baffles 14, cone 15, and impeller 19 as they appear in FIG. 1 are shown in a somewhat distorted, "exploded" manner in FIG. 1 for clarity of illustration. As can be seen from the section view of FIG. 2, impeller 19 actually fits very closely underneath cone 15, and the baffles 14 extend much further downward so that their lower edges almost touch the bottom surface 20 of star-shaped base plate 22 of impeller 19. The center portion of base plate 22 has a centered, cone-shaped peak 23 that fits closely up inside of the underside of cone 15. A plurality of vertical vanes 24 are disposed on the edges of each of the six protrusions 30 (FIG. 5) of impeller 19. A drive gear 25 (FIG. 2) is attached to the center of the lower surface of impeller 19. Drive gear 25 engages the two inner gears of gear assembly 27, described subsequently.

Figure 5:
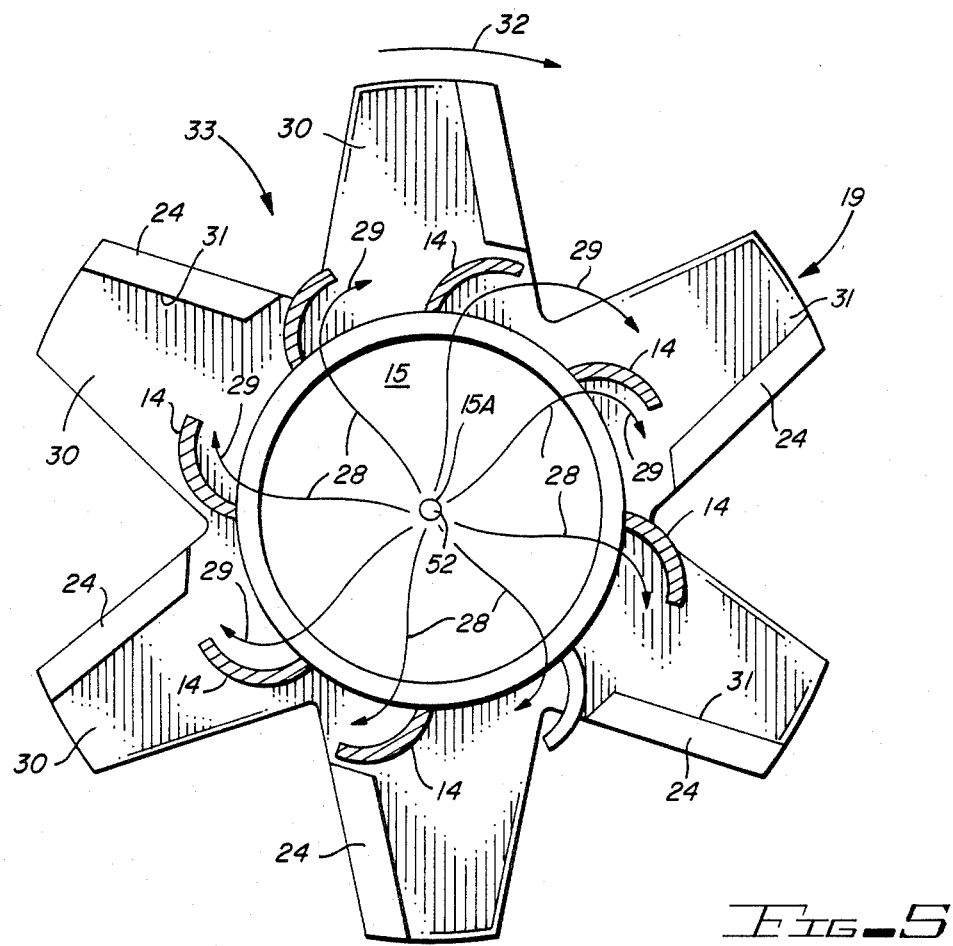
FIG. 5 is a section view taken along section line 5—5 of FIG. 2 illustrating the relative position of the diversion baffles and the impeller of the distribution valve.

First, however, the configuration of baffles 14 and impeller 19 are described in more detail with reference to FIG. 5, which is a section view taken along section line 5—5 of FIG. 2. In FIG. 5 it can be seen that water flowing from inlet port 7 downward at high pressure onto cone 15 first is directed by peak 15A thereof and then flows outward uniformly in all directions, as indicated by arrows 28. The downwardly, outwardly moving water then strikes the vertical baffles 14 and is deflected clockwise in the direction indicated by arrows 29.

In accordance with one aspect of the present invention, the large upper surface areas of the six protrusions 30 of impeller 19 cooperate with the vertical baffles 14 to greatly confine the direction of flow of high velocity water to the general direction of arrows 29. This water then directly strikes the inner faces 31 of the vertical impeller vanes 24, resulting in a high clockwise impeller torque in the direction of arrow 32. The vertical baffles 14 are stationary, of course, so as impeller 19 rotates, the V-shaped gaps such as 33 between adjacent protrusions 30 of impeller 19 allow the water deflected by cone 15 and baffles 14 to flow downward into the lower portion of chamber 12 after the force of that water has been spent in turning impeller 19. This feature results in relatively low drop in "head pressure" of the water from inlet port 7 to the presently open one of outlet ports 10.

It should be noted that in each of vertical impeller vanes 24 has an inner vertical edge which barely clears the outer surfaces of the vertical baffles 14 as impeller 19 rotates.

We have found that the above described configuration of impeller 19, vertical baffles 14, and cone 15 results in very high impeller torque even at very low inlet water flow rates and pressures.

Figure 4:
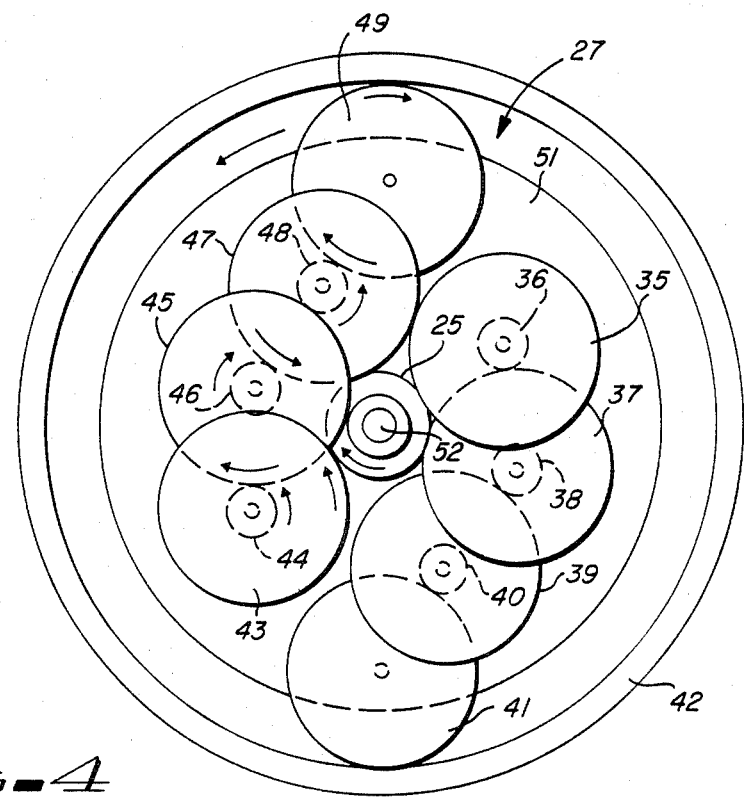
FIG. 4 is a plan view of the planetary gear assembly of the distribution valve taken along section line 4—4 of FIG. 1.

Next, the gear assembly 27 will be described. It includes two symmetrical chains of gears each driven by impeller gear 25. The configuration of gear assembly 27 can be best visualized by referring to FIG. 2 and also to FIG. 4, which is a section view along section line 4—4 of FIG. 2. The first such chain of gears includes a first large gear 35 which is driven by impeller gear 25. Gear 35 turns small coaxial gear 36, which in turn drives another large gear 37. Large gear 37 turns a coaxial small gear 38, which in turn drives large gear 39. Gear 39 turns small coaxial gear 40, which drives large outer gear 41. The teeth of outer gear 41 engage the inner teeth of a stationary planetary gear 42 that preferably is molded integrally with upper housing section 5. Similarly, and symmetrically with the above-described first chain of gears, impeller gear 25 also drives large gear 43, which turns coaxial small gear 44. Gear 44 turns large gear 45, which turns coaxial small gear 46. Gear 46 turns large gear 47, which turns small coaxial gear 48. Finally, small gear 48 turns large outer gear 49, which engages the teeth of planetary gear 42 on the opposite side of a rotary gear support plate 51 which rigidly supports the shafts or axels about which each of the above-mentioned gears rotates.

Each of the small gears 36, 38, etc., has nine teeth. Each of the large gears, such as 35, 37, etc., has thirty-six teeth. Impeller gear 25 has sixteen teeth, and finally, planetary gear 42 has one hundred and twenty inner teeth, leading to a reduction ratio between impeller 19 and gear support plate 51 of four hundred and eighty turns of impeller 51 to one turn of gear support plate 51 and hence of cam 53.

Figure 2:
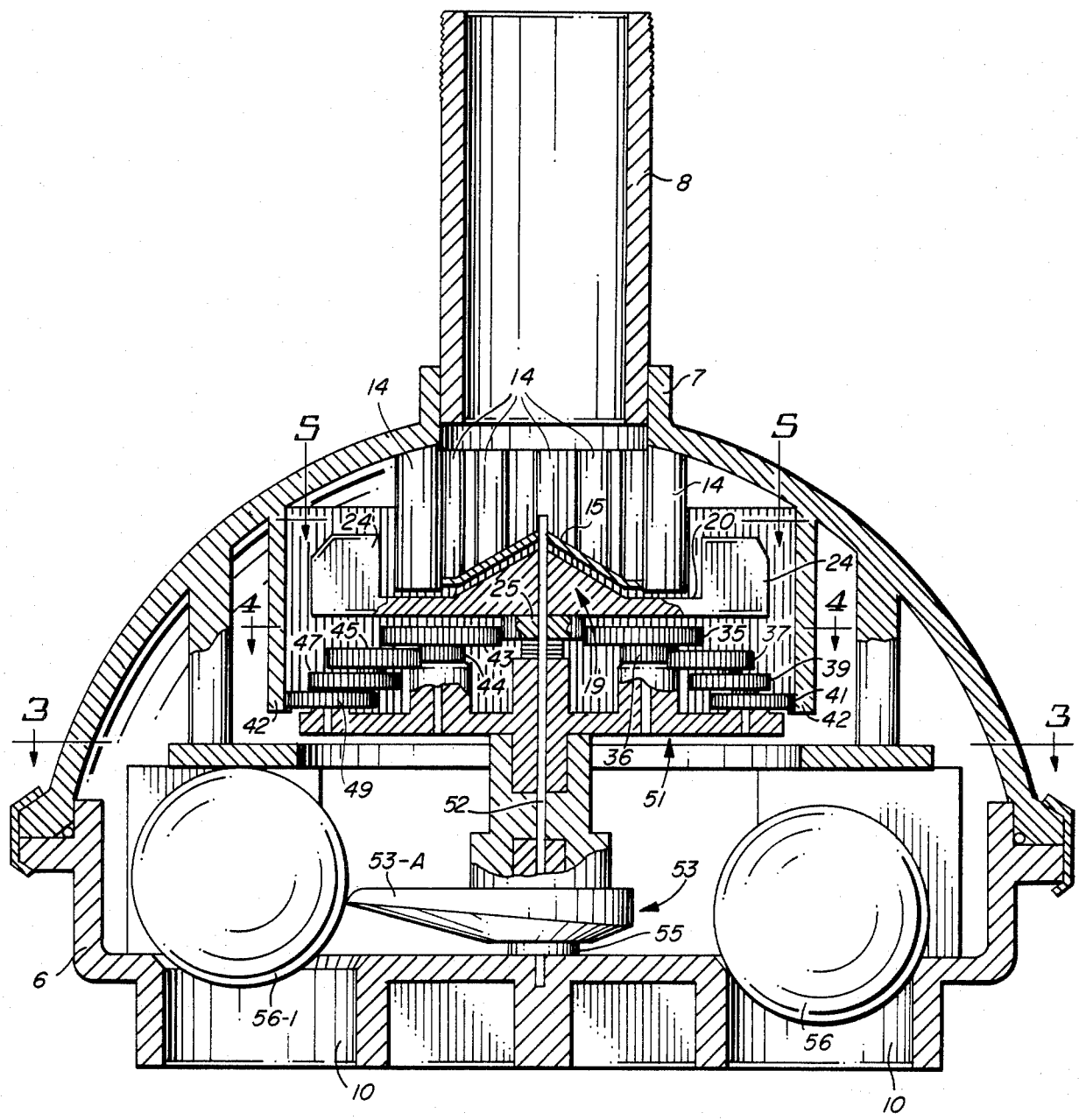
FIG. 2 is a section view of the distribution valve shown in FIG. 1, taken along section line 2—2.

At this point, it can be seen by reference to FIG. 2 that a vertical axel 52 is supported by the bottom of lower housing section 6 and has an upper end extending through and supported by the upper peak portion of cone 15. Vertical axel 52 functions as an axis about which impeller 19, gear support plate 51, and cam 53 rotate.

Figure 3:
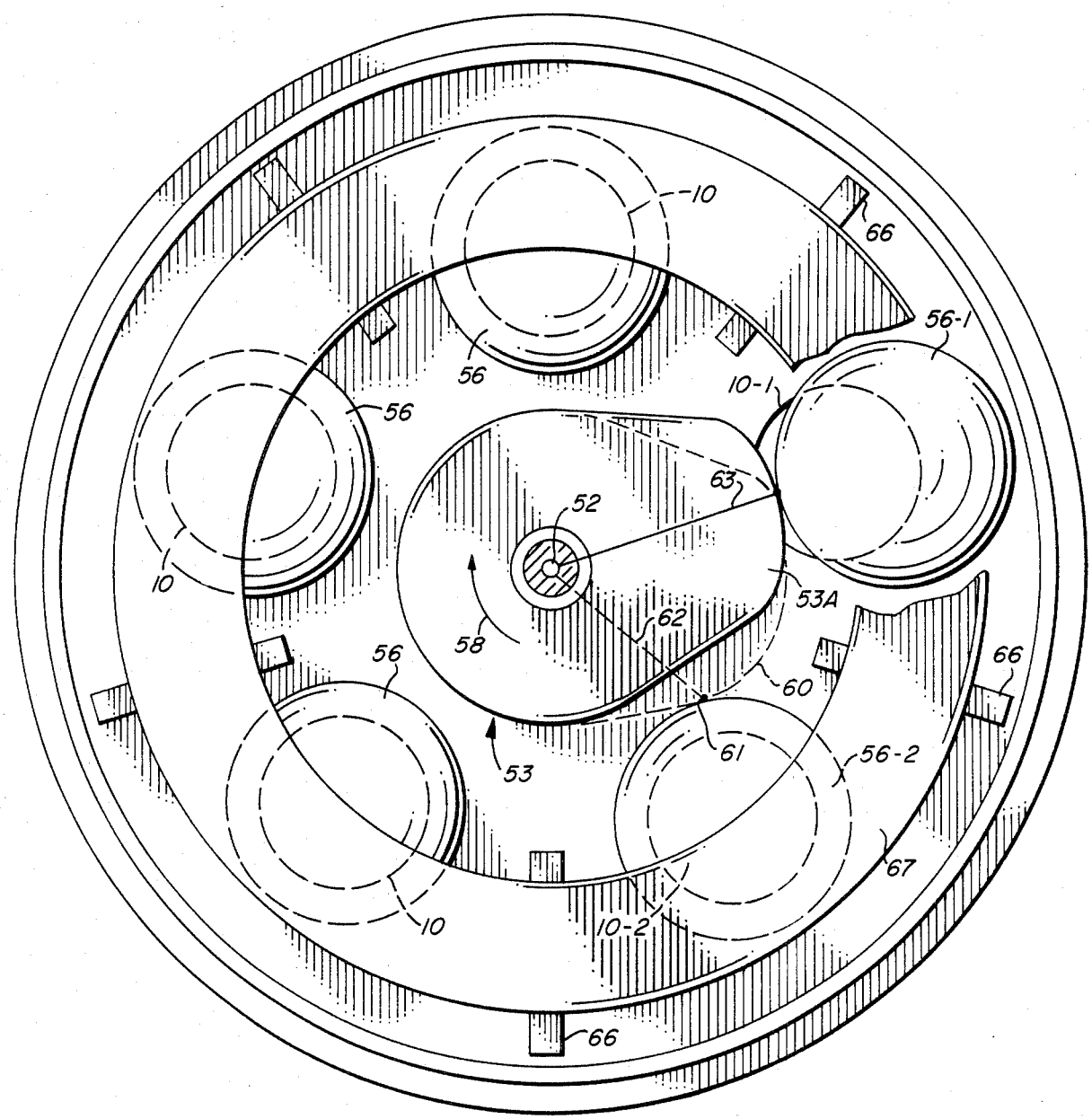
FIG. 3 is a section view taken along section line 3—3 of FIG. 2.

Attached rigidly to the bottom of gear support plate 51 is a foot-shaped cam 53. As best seen in FIG. 3, which is a sectional view along section line 3—3 of FIG. 2, the lower foot-shaped portion of cam 53 has a roughly eliptical configuration and rotates eccentrically about axel 52. The lower surface of the eccentric rotation point of cam 53 has a washer-shaped spacer 55 thereon which supports cam 53 and the entire gear assembly and rotary gear support 51 with a minimum amount of friction as cam 53 rotates.

The five outlet ports 10 each have an inclined upper peripheral edge surface that mates with one of the five acrylic valve balls 56. Normally, each of the acrylic balls 56 is seated in a respective one of ports 10 to close that port. The high water pressure in the interior chamber 12 of distribution valve 1 produces additional downward force on each of the valve balls 56, further improving their sealing action. In accordance with the operation of distribution valve 1, gear support plate 51 rotates cam 53 in the direction indicated by arrow 58 (FIG. 3). The shape of the most outwardly extending, ball-contacting portion 53A of cam 53 is such that at least one of valve balls 56 is always at least partially unseated, as is ball 56-1 in FIGS. 2 and 3, causing at least one of outlet ports 10 to be at least partially open. The width of ball contacting or "toe" end portion 53A of cam 53 is such that cam 53 rotates from the configuration shown by solid line 53 in FIG. 3, wherein port 10-1 fully open a maximum amount to the position indicated by dotted lines 60. The first point of cam 53 to touch ball 10-2 in FIG. 3 is point 61. The radius of cam 53 to point 61 is designated by reference numeral 62. Radius 62 is substantially shorter than the maximum contact point radius 63. Clearly the initial mechanical advantage at initial contact point 61 is greater than for subsequent contact points at which cam 53 engages each valve ball. For a small portion of the rotation of cam 53, both ball valves 56-2 and 56-1 are partially open. The fact that each subsequent valve ball is partially unseated before the previous one is re-seated prevents water pressure from building up to too high a level inside chamber 12 and also the resulting force of that ball on cam 53 aids unseating of the next ball 56.

In order to prevent valve balls 56 from becoming unseated and rolling around inside chamber 12, a plurality of vertical dividers 66 are positioned midway between each pair of adjacent valve balls. The dividers 66 are supported by an attached ring 67, and can be removed as a unit.

We have undertaken considerable experimentation to determine optimum materials for the gears. At this point, DELRIN plastic material seems to be most satisfactory in that it has adequate strength on the models we have tested. It has the shortcoming that if the swimming pool owner does not maintain the proper chemical balance in the pool, i.e., if he allows the acid concentration to become too high, the DELRIN material deteriorates. However, if the pH level of the pool water is maintained properly, DELRIN plastic gears provide excellent performance and reliability.

The above-described distribution valve has been found to provide virtually no loss in head pressure, due to its open internal chamber structure. The above-described impeller structure, in combination with the cone 15 and vertical baffles 14 (both of which are known in the art) along with the star-shaped protrusions 30 of impeller 19 and vertical vanes 24 mounted on the edge portions thereof, has been found to provide adequate torque to operate cam 53 at extremely low inlet water pressures. The presence of the large V-shaped gaps 33 (FIG. 5) between the protrusions 22 of impeller 19 results in low water pressure loss as the water is exhausted from impeller 19. The relatively high turbulence produced beneath impeller 19 continually flushes all of the gears in gear assembly 27, preventing residues from forming thereon. The symmetric, dual chain of gears in gear assembly 27, in conjunction with the planetary gear 42, provides balanced rotational forces on gear support plate 51 that have been found to produce excellent performance with minimum gear wear with a relatively low number of total gears in the system. The shape of the cam 53 results in a high initial mechanical advantage as the cam initially contacts and unseats a valve ball. The simplicity and very high initial mechanical advantage of the above-described distribution valve makes it highly reliable and low in manufacturing cost.

While the invention has been described with reference to a particular embodiment thereof, those skilled in the art will be able to make certain modifications apart from the disclosed embodiment of the invention but are within the true spirit and scope of the invention.

We claim:

1. A fluid distribution valve having an inlet port for receiving fluid under pressure and also having a plurality of outlet ports through which the received fluid is sequentially expelled under pressure, said fluid distribution valve comprising in combination:
    (a) a housing having said inlet port and said plurality of outlet ports therein, said housing bounding an interior chamber, said inlet port being located at the top of said housing and directing flow of said fluid downward into said chamber;
    (b) a rotary impeller disposed beneath said inlet port in said chamber, and having a rotary star-shaped plate and a plurality of vertical vanes each supported along an edge of a respective broad extension of said star-shaped plate for rotating in response to flow of fluid into said chamber through said inlet port, said impeller having a first gear attached rigidly thereto, said star-shaped plate having an upper surface;
    (c) a plurality of stationary, substantially vertical baffles disposed in said chamber between said inlet port and said impeller, each of said baffles extending nearly to the upper surface of said star-shaped plate, each of said vertical baffles constraining said fluid to flow against said vertical vanes and the upper surfaces of said broad extensions of said impeller as it rotates, said stationary baffles cooperating with said broad extensions of said star-shaped plate adjacent to said vertical vanes to constrain a substantial portion of the incoming fluid to flow directly against said vertical vanes of said impeller and then to allow that fluid to pass unimpeded through gaps between said broad extensions in said star-shaped plate and lower into said chamber as said impeller continues to rotate;
    (d) a planetary gear attached in stationary relationship to said housing in the interior thereof;
    (e) gear reduction means having a second gear for meshing with said first gear and a third gear responsive to rotation of said second gear in geared-down relationship thereto for meshing with said planetary gear, said gear reduction means including a rotary base for supporting said second and third gears, said rotary base rotating in geared-down relationship to said impeller in response to rotation of said impeller, said first, second, and third gears being disposed immediately beneath said impeller whereby a high level of turbulence of fluid received from said impeller effects continual flushing and cleaning of the gears in said gear reduction means to prevent build-up of deposits thereon;
    (f) a plurality of spherical valve balls each seated in a circular seating surface of a respective one of said outlet ports; and
    (g) a foot-shaped cam rigidly attached in fixed relationship to said rotary base for rotation in response to rotation of said impeller and in geared-down relationship to said impeller, for sequentially unseating respective ones of said valve balls to allow water to be ejected from said chamber through unseated outlet ports.

2. The fluid distribution valve of claim 1 wherein said foot-shaped cam has a substantially oval, eccentric configuration having a shape such that the point at which a ball-engaging surface of said cam first touches the next valve ball to be unseated has a relatively short radius from the eccentric point of said foot-shaped cam to that point, the radius of the point of contact with that valve ball having values that increase to a maximum value that is substantially greater than said initial value as said foot-shaped cam rotates past that valve ball, in order to produce an initial high mechanical advantage as that valve ball initially is lifted from its circular seating surface by said foot-shaped cam.

3. The fluid distribution valve of claim 2 wherein the bottom surface of said foot-shaped cam includes a spacer element to prevent peripheral portions thereof from frictionally engaging the interior of said housing.

4. The fluid distribution valve of claim 3 wherein said gear reduction means includes two substantially identical symmetric chains of gears each having a first gear that engages said first gear of said impeller and each having an outer gear that engages opposed portions of said planetary gear in order to balance forces on said rotary base and minimize wear of said first, second, third, and planetary gears.

5. The fluid distribution valve of claim 4 wherein each of the gears of said gear reduction assemblies and said first gear are composed of plastic material.

6. The fluid distribution valve of claim 5 wherein said impeller is composed of plastic material.

7. The fluid distribution valve of claim 6 including a dividing structure disposed in said housing beneath said rotary base for confining each of valve balls to a predetermined region.

8. The fluid distribution valve of claim 1 wherein each of said vertical vanes has an inner edge that barely clears said vertical baffles as said rotary impeller rotates, to thereby contribute to said constraining of a substantial portion of said incoming fluid.

* * * * *